United States Patent [19]
Bennett et al.

[11] Patent Number: 6,014,099
[45] Date of Patent: Jan. 11, 2000

[54] ISAR METHOD TO ANALYZE RADAR CROSS SECTIONS

[75] Inventors: John G. Bennett, Macomb County; Jack C. Jones, Oakland County, both of Mich.

[73] Assignee: The United States of America as represented by the Secretary of the Army, Washington, D.C.

[21] Appl. No.: 09/208,154

[22] Filed: Nov. 9, 1998

[51] Int. Cl.[7] .................................................. G01S 13/90
[52] U.S. Cl. .......................... 342/25; 342/52; 342/179; 342/180; 342/197
[58] Field of Search .............................. 342/25, 52, 54, 342/55, 179, 180, 190, 191, 192, 194, 197

[56] References Cited

U.S. PATENT DOCUMENTS

| | | | |
|---|---|---|---|
| H1720 | 4/1998 | Chen | 342/25 |
| 5,079,555 | 1/1992 | Turpin | 342/25 |
| 5,262,781 | 11/1993 | Evans | 342/25 |
| 5,281,972 | 1/1994 | Jain | 342/25 |
| 5,392,050 | 2/1995 | Guerci et al. | 342/90 |
| 5,394,151 | 2/1995 | Knaell et al. | 342/25 |
| 5,419,631 | 5/1995 | Slater | 356/35 |
| 5,497,158 | 3/1996 | Schmid et al. | 342/90 |
| 5,610,610 | 3/1997 | Hudson et al. | 342/25 |
| 5,736,958 | 4/1998 | Turpin | 342/17 |
| 5,751,243 | 5/1998 | Turpin | 342/17 |
| 5,805,099 | 9/1998 | Nagata | 342/25 |
| 5,821,896 | 10/1998 | Nakano | 342/90 |
| 5,854,602 | 12/1998 | Stankwitz et al. | 342/25 |

FOREIGN PATENT DOCUMENTS

| | | | |
|---|---|---|---|
| 09033649A | 2/1997 | Japan | G01S 13/89 |
| 298690A | 2/1997 | Japan | H04B 10/08 |
| 2326042A | 12/1998 | United Kingdom | G01S 13/90 |

OTHER PUBLICATIONS

"Spherical wave near–field imaging and radar cross–section measurement", Broquetas, A.; Palau, J.; Jofre, L.; Cardama, A., Antennas and Propagation, IEEE Transactions on vol.: 46 5, May 1998, pp. 730–735.

"Complex target signature generation", Signal Processing, 1996., 3rd International Conference on vol: 1, 1996, pp.: 485–488 vol. 1.

"Development of a static full–scale aircraft RCS and large antenna measurement facility", Liebenberg, R.; Steenkamp, J.A.J., AFRICON, 1996., IEEE AFRICON 4th vol: 1, 1996, pp. 89–94 vol. 1.

"Three–dimensional ISAR imaging using a conventional high–range resolution radar", Seybold, J.S.; Bishop, S.J., Radar Conference, 1996., Proceedings of the 1996 IEEE National, 1996, pp. 309–314.

"Generation of point scatterer models using PTD/SBR technique", Shuen–Yih Wang; Shyh–Kang Jeng, Antennas and Propagation Society International Symposium, 1995. AP–S. Digest vol.:4, 1995, pp. 1914–1917.

"Dynamic imaging and RCS measurements of aircraft", Jain, A.; Patel, I., Aerospace and Electronic Systems, IEEE Transactions on vol.: 31 Jan.1, 1995, pp. 211–226.

(List continued on next page.)

*Primary Examiner*—John B. Sotomayor
*Attorney, Agent, or Firm*—Peter A. Taucher; David L. Kuhn

[57] ABSTRACT

A method of analyzing the radar cross section of a target vehicle determines the contributions to total radar cross section of various vehicle design details. The method includes obtaining ISAR images of the vehicle with a radar at a known position relative to the vehicle. A visible three-dimensional set of images of the vehicle is created. The visible images have the same point of view as the ISAR images. Each visible image is matched by one or more corresponding ISAR images in terms of distance from the target and angular position of the target relative to the vehicle's axis of rotation. The corresponding ISAR images are used to paint the visible images so as to produce one or more rendered composite images of the vehicle. A relation is then found between chosen vehicle details and bright zones in the composite image.

8 Claims, 4 Drawing Sheets

OTHER PUBLICATIONS

"Wide–bandwidth mobile radar for ISAR/SAR radar imaging", Mackenzie, J.D.; Brown–Kenyon, E.J., Radar and Microwave Imaging, IEE Colloquium on, 1994, pp. 6/1–6/6.

"An overview of radar cross section measurement techniques", Tice, T.E., Instrumentation and Measurement Technology Conference, 1989, IMTC–89. Conference Record., 6th IEEE, 1989, pp. 344–346..

"An overview of radar cross section measurement techniques", Tice, T.E., Instrumentation and Measurement, IEEE Transactions on vol. 39 Feb.1, 1990. pp. 205–207.

"MMW radar cross section range characterizes targets", Scheer, J.A.; Chastain, W.E.; Alexander, N.T.; Bruder, J.A.; Scheer, C.R.; Horst, M.M.; Trostel, J.M., Radar Conference, 1988., Proceedings of the 1988 IEEE National, 1988, pp. 209–213.

ISAR METHOD TO ANALYZE RADAR CROSS SECTIONS

GOVERNMENT USE

The invention described here may be made, used and licensed by the or for the U.S. Government for governmental purposes without paying us any royalty.

BACKGROUND

A key step in designing vehicles with a low radar signature is isolating the contributions of various vehicle configuration details to the vehicle's total radar cross section or RCS, which may be regarded as a flat, two-dimensional radar image of the vehicle. For our purposes, configuration details would include individual components of the vehicle such as hatch covers or gun tubes or antennae. Such details would also include vehicle geometry items such as corners, edges and surface shape of hulls, bodies, cabs or turrets. Configuration details would typically further include juxtapositions of individual components with each other or with vehicle geometry items.

One method of obtaining a vehicle's RCS is by using an inverse synthetic aperture radar, or ISAR, which is similar to the synthetic aperture radar, or SAR, technique used by aircraft to view a selected target. By way of background, as illustrated in FIG. 1, a SAR system produces high-resolution images by combining radar returns from several locations along a flight path. An aircraft 10 flies along path 12, directs its radar at stationary target 14 and receives radar returns at points 16a through 16g along the flight path. By integrating the radar returns, the aircraft's relatively small radar simulates a very large, much more accurate antenna.

The basic difference between the synthetic aperture radar technique and ISAR is that, in ISAR, the target is moved in a controlled fashion while the antenna remains stationary. Particularly, as seen in FIG. 2, the target 14 is rotated on turntable 18 while being imaged by a stationary radar antenna 20 mounted on tower 22. The ISAR system combines radar returns from a wide rage of azimuths relative to the target, thus again synthesizing a large antenna.

Like a synthetic aperture radar system, an ISAR system produces a flat, two-dimensional image of a target. The mathematically simplest image formation occurs when the radar antenna has a zero elevation relative to the target and radar signals have a central line of travel 24 intersecting the target's rotational axis 26, as is the case in FIG. 3. The range R from the antenna of a given scattering center 28, or radar reflecting zone, on the target is determined conventionally from the time of flight of the echo. The rotation of the scattering center on the turntable creates a Doppler shift from which the cross range dimension C can be determined. The cross range dimension is the distance of the scattering center from the turntable's rotational axis along a line normal to line of travel 24. The range and cross range values may be regarded as vectors within an ISAR plane.

FIG. 4 shows the more general case where a radar is at a nonzero elevation angle wherein an ISAR plane 30 can tilted relative to a horizontal plane 32 and is not necessarily parallel to the rotational path 34 of a scattering center on the turntable. The angle of elevation, $\phi$, is now a variable in calculating the aforementioned Doppler shift experienced by the radar. In practice, a two-dimensional Fourier transform simultaneously performs the calculations necessary to determine the range and cross range values.

Although the ISAR image is generated by signals from radar 20, the point of view, or apparent position of from which the ISAR image is perceived, is not that of radar 20. Rather, the point of view lies on a line perpendicular to the ISAR plane. For example, if the radar antenna has a zero elevation relative to the target and radar signals have a central line of travel 24 intersecting the target's rotational axis 26, as is the case in FIG. 3, then the point of view lies along axis 26.

SUMMARY

We improve upon the known methods of ISAR imaging. In our method, visible images of the vehicle are made where the visible images' point of view is the same as that of corresponding ISAR images. The visible images can be CAD images or video images of the vehicle. We process the ISAR and visible images as necessary to make them appear equidistant from the vehicle. The images are also matched according to the angular position of the vehicle on a reference axis as the vehicle rotates about that axis.

In our simplest mode of image analysis, the matched visible and ISAR images are output to a visual display side by side. Matched "movies" of the visual and ISAR images can be run side by side, where the vehicle is shown rotating about the reference axis during the movies. In a more advanced mode of image analysis, the input from one or more ISAR images is painted onto a three-dimensional representation of the vehicle. The painting results in a composite image of the vehicle whose outer surfaces are colored, brightened or textured as a function of input from the ISAR images. Either the side by side image outputs or the composite images allow finer determination of contributions to RCS of vehicle design details or components than with prior methods.

DETAILED DESCRIPTION

Figure 1:
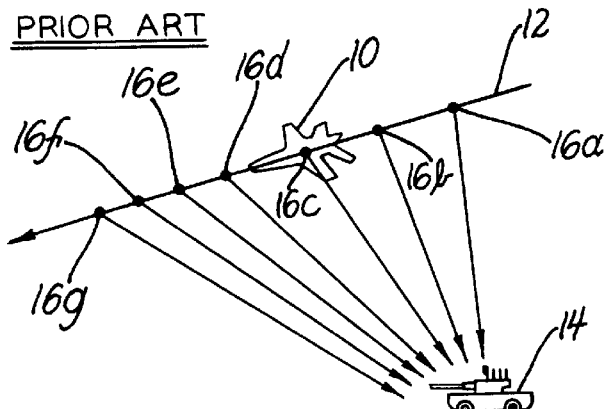
FIG. 1 shows the mobile radar and stationary target of a synthetic aperture radar, or SAR, system.
Figure 2:
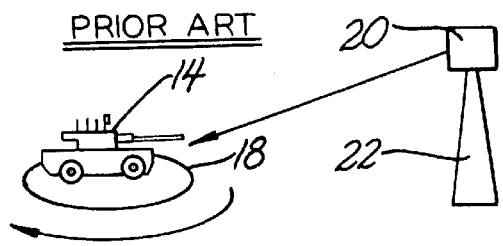
FIG. 2 shows the stationary radar and rotating target of an inverse synthetic aperture radar, or ISAR, system.
Figure 3:
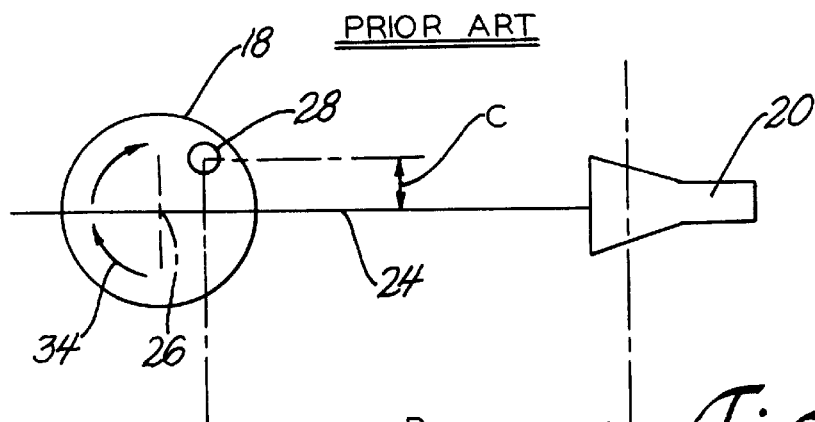
FIG. 3 is a schematic diagram of an ISAR system wherein the radar is at zero elevation relative to the target.
Figure 4:
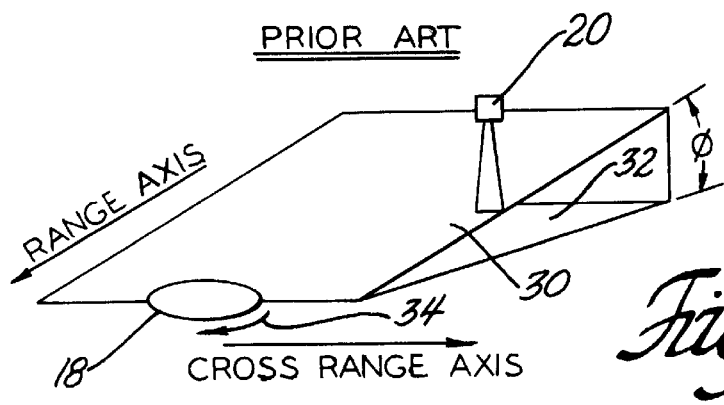
FIG. 4 is a diagram of an ISAR system wherein the radar is at a nonzero elevation relative to the target.
Figure 5:
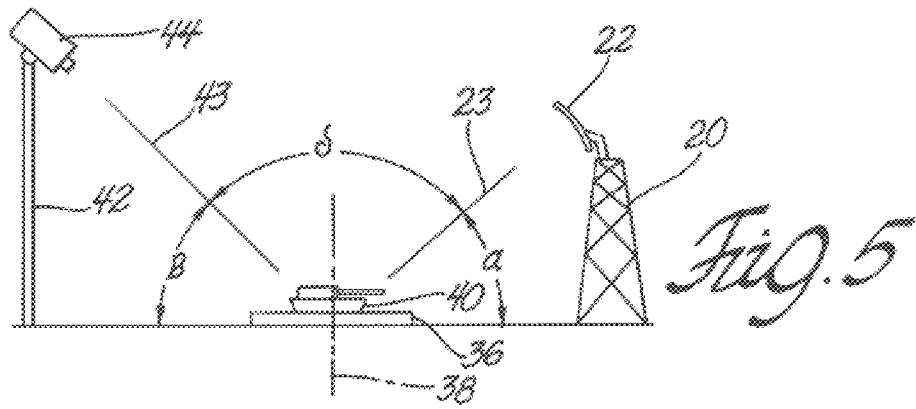
FIG. 5 shows the juxtaposition of hardware components and target used in our improved method to analyze radar cross section, or RCS.

FIG. 5 illustrates the hardware used in our improved method to determine individual components' contributions to the total radar cross section of a vehicle. A horizontal turntable 36 has a vertical rotational axis 38, which preferably passes through the volumetic center of a target vehicle 40 resting on the turntable. On tower 20 is a radar antenna 22 that looks down upon the target vehicle along a line of sight 23 having at an angle α relative to the horizontal, α typically being between 5 and 65 degrees. On mast 42 is a video camera 44 that looks down upon the target vehicle along a line of sight 43 at an angle β relative to the horizontal, β typically being between 25 and 85 degrees. It is preferred that α and β be complementary, i.e., that their sum will be 90 degrees so that the angle δ between α and β will also be 90 degrees. It is further preferred that the lines of sight be in the same vertical plane as rotational axis 38. Still further, it may be preferred that the distances of the antenna and camera from the target vehicle be adjusted so that the camera and antenna produce respective images of equal scale, so that the target vehicle appears to be the same size in the respective images. By means of the just-described preferred alignment of the target vehicle, radar antenna and video camera, the video camera and radar antenna will have the same point of view relative to the target vehicle.

Figure 6:
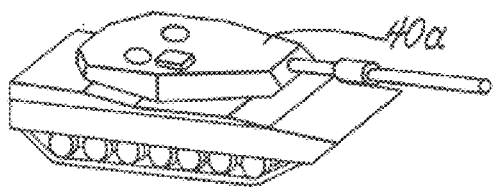
FIG. 6 is a graphic representation of a target vehicle as seen by a video camera used in the improved method.
Figure 7:
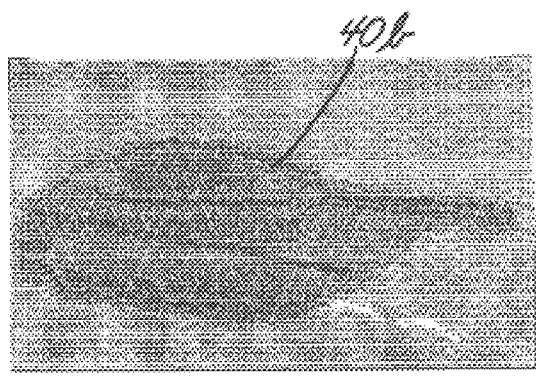
FIG. 7 is a graphic representation, for illustrative purposes only, of the same target vehicle as imaged by a radar to produce the ISAR used in our improved method.
Figure 11:
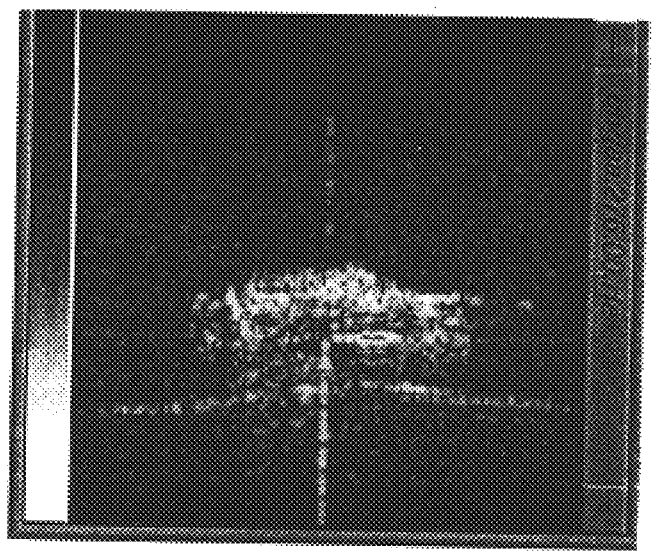
FIG. 11 is an ISAR image of the vehicle and turntable taken from the same point of view as the CAD image.

Images from selected points of view are acquired by the radar and stored in a computer database or library or on a suitable storage medium. Typically, the images are in sequenced sets that are essentially a movie of the target vehicle as it rotates 360 degrees. In a similar fashion, the video images from the camera are also stored in an analogous database or library. FIG. 6 is a graphic representation 40a of the target vehicle as viewed by a video camera, where the target vehicle is an Abrams M1A1 Main Battle Tank. FIG. 7 is graphic representation 40b, intended for illustration purposes only, of the same target vehicle as viewed by the radar. A truer representation of an ISAR image is submitted as FIG. 11, which is a black and white version of actual ISAR image of the target vehicle as seen from a slightly different point of view than the FIG. 7 representation.

Once the ISAR and video images have been acquired and stored, the process of analyzing the images begins. In the simplest form, the analysis is done via side-by-side comparison of images from the video database and the ISAR database, both images having the same point of view and scale. Single images from the respective databases can be compared or entire movies or portions thereof can be compared. Additionally, a coordinated zoom can be conducted for zones of interest on one or both of the ISAR and video images. A coordinated zoom targets the same point or zone of the vehicle in each image and magnifies the respective image zones to the same extent. This technique is especially useful in finding vehicle components or geometry that are linked to so-called "hot spots" or particularly bright areas of the ISAR image of the target vehicle.

Figure 8:
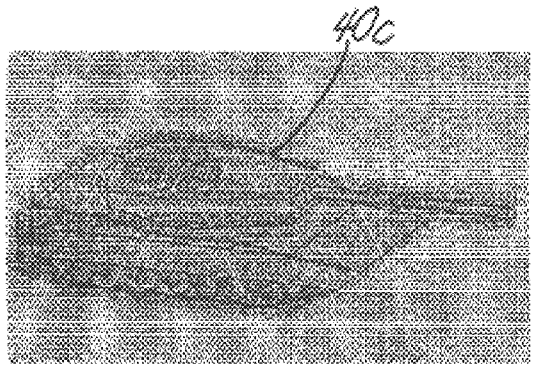
FIG. 8 is a superimposition of FIG. 7 onto FIG. 6, and represents the superimposition of an ISAR image onto a video image in our method.
Figure 9:
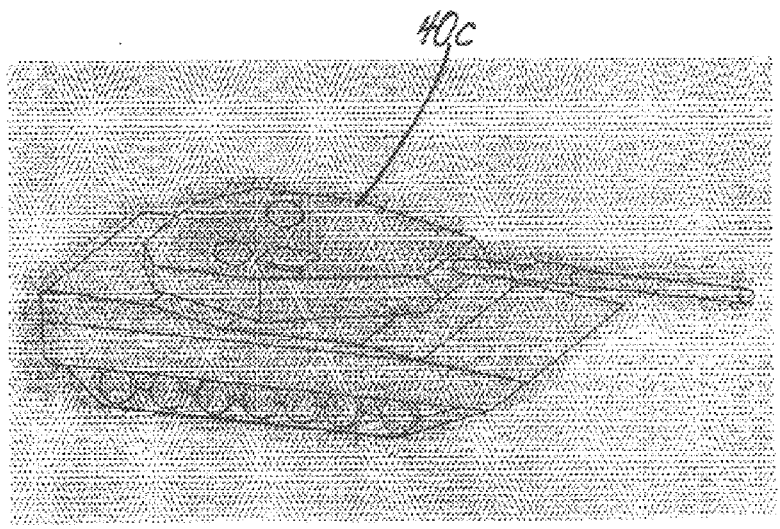
FIG. 9 is an enlargement of FIG. 8, which facilitates discernment of the video portions from ISAR portions of the overall image.

Another image processing technique is to simply superimpose the ISAR image on its video counterpart or vice versa. The composite image 40c which results from this technique is shown by FIG. 8, which is the graphic sum of FIGS. 6 and 7 where the images from the latter figures are in registry. FIG. 9 is an enlargement of FIG. 8 that facilitates discernment of the video component of composite image 40c. As with the side-by-side technique, temporal sequence of the composite images can be run as a movie.

Figure 10:
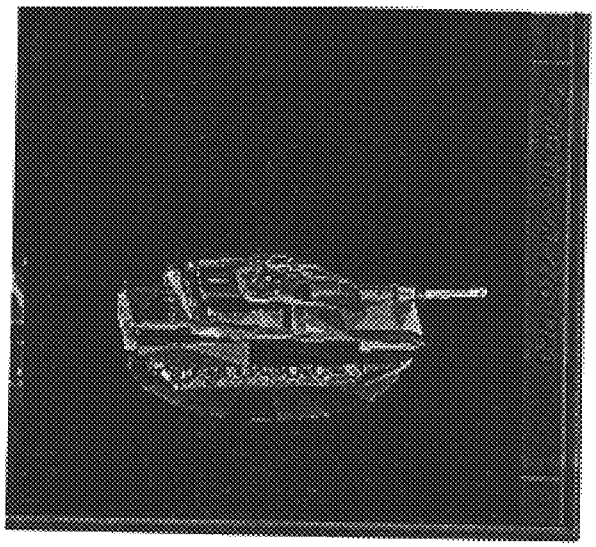
FIG. 10 is a rendered CAD image of the target vehicle.

An alternative to of our method is to use three-dimensional CAD images of the target vehicle in place of the video images. The U.S. Army currently has a software program, the Faceted Regional Editing Device, or FRED, that has an associated database of graphics files for the Abrams M1 tank. The FRED program is capable of generating CAD images of the tank from any distance or perspective, and can emulate a tank rotating on horizontal turntable 36 (FIG. 5). A rendered FRED CAD image of an M1A1 Abrams tank and the turntable is submitted as FIG. 10. It is believed that other software with CAD capability could be substituted for the FRED program when using our method. The CAD image of the tank would have an apparent line of sight analogous to the real line of sight 43 of camera 44 in FIG. 5. That is, the CAD image of the tank will appear to be viewed from the same position relative to the tank as camera 44 in FIG. 5. In another manner of speaking, the CAD image and the video image from camera 44 have the same point of view.

Figure 12:
FIG. 12 is an example of a CAD image painted in accordance with input from an ISAR image.

It is, of course, possible to use the aforementioned side-by-side and superimposition techniques to help identify vehicle components' contributions to the radar cross section of target vehicle 40. However, our work to date shows that it is feasible and probably better to use commercially available mapping software to "paint" the FRED CAD image with the input from the ISAR image. That is, each point or pixel of the ISAR image is assigned to a particular position within a face or facet on the FRED CAD image. The FRED image is thereby rendered to appear as a solid object having its sides or facets coated or textured in a controlled fashion. A FRED CAD image as painted with mapping software is submitted as FIG. 12.

We believe that a vehicle designer should examine the vehicle ISAR images from at least three elevation angles and a full circle of azimuth positions. Such examination effectively allows the designer to judge how a particular vehicle component contributes to the overall radar cross section of the vehicle. Accordingly, we believe that it is very much preferable to combine data from multiple ISAR images into a single three-dimensional display. Specifically, we use software to process and map data points from multiple ISAR images onto a three-dimensional FRED rendering of an Abrams M1A1 tank to create a composite image. For example, azimuth sector averages or sums of a set of ISAR images can be plotted onto the three-dimensional display, and the same can be done for elevation sector averages or sums, or for solid-angle sectors incorporating selected ranges of azimuth and elevation angles. When a sufficient set of composite images has been created, so that 360 degrees of ISAR azimuth images over a range of elevation angles is represented, then individual vehicle components can be viewed or analyzed to determine their contribution to overall radar cross section.

We wish it to be understood that we do not desire to be limited to the exact details of construction or method shown herein since obvious modifications will occur to those skilled in the relevant arts without departing from the spirit and scope of the following claims.

What is claimed is:

1. A method of analyzing the radar cross section of a target wherein the contributions to total radar cross section of various target details are determined, the method comprising:

obtaining a multiplicity of ISAR images of the target by means of a radar positioned at known elevation angles and distances relative to the target as the target moves in a controlled fashion;

creating a three-dimensional, visually perceptible set of images of the target as the target moves;

processing the visually perceptible set of images so that the visually perceptible set of images has the same point of view as the ISAR images and each image of the visually perceptible set matches a corresponding ISAR image in terms of distance from the target and angular position of the target relative to the known axis;

utilizing the set of visually perceptible images and the corresponding ISAR images to paint the corresponding ISAR images one or more three-dimensional representations of the target so as to produce one or more rendered composite image of the target;

continuing to produce the one or more composite images until ISAR images from a fall circle of ISAR positions at three or more elevation angles are represented in the one or more composite images of the target;

ascertaining correspondence between chosen target details and bright zones in the one or more composite images caused by ISAR image input.

2. A method of analyzing the radar cross section of a vehicle wherein the contributions to total radar cross section of various vehicle details are determined, the method comprising:

obtaining a multiplicity of ISAR images of the vehicle by means of a radar positioned at known elevation angles and distances relative to the vehicle as the vehicle revolves about a known axis passing through a center of volume of the vehicle;

creating a three-dimensional, visually perceptible set of images of the target rotating about the known axis;

processing the visually perceptible set of images so that the visually perceptible set of images has the same point of view as the ISAR images and each image of the visually perceptible set matches a corresponding ISAR image in terms of distance from the target and angular position of the target relative to the known axis;

utilizing the set of visually perceptible images and the corresponding ISAR images to place data from the corresponding ISAR images onto one or more three-dimensional representations of the vehicle so as to produce one or more composite images of the target;

continuing to produce the one or more composite images until ISAR images from a full circle of ISAR positions at three or more elevation angles are represented in the one or more composite images of the vehicle;

ascertaining correspondence between chosen vehicle details and bright zones in the one or more composite images caused by ISAR image input.

3. A method of analyzing the radar cross section of a vehicle wherein the contributions to total radar cross section of various vehicle details are determined, the method comprising:

obtaining a multiplicity of ISAR images of the vehicle by means of a radar positioned at known elevation angles and distances relative to the vehicle as the target revolves about a known axis;

creating a three-dimensional, visually perceptible set of images of the target rotating about the known axis wherein the visually perceptible set of images has a first line of sight, real or apparent, that is normal to second line of sight along which the radar aims at the vehicle;

processing the visually perceptible set of images so that the visually perceptible set of images has the same point of view as the ISAR images and each image of the visually perceptible set matches a corresponding ISAR image in terms of distance from the target and angular position of the target relative to the known axis;

outputting simultaneously on a viewable medium a selected one of the visually perceptible images and the corresponding ISAR image;

ascertaining correspondence between chosen vehicle details and bright zones in the corresponding ISAR image.

4. The method of claim 3 further comprising the steps of:

Turning the vehicle about an axis that passes through a center of volume of the vehicle; and orienting the axis to be in a common plane with the first line of sight and the second line of sight.

5. The method of claim 3 wherein the first and second lines of sight are perpendicular to one another.

6. The method of claim 5 wherein a video camera is aimed at the vehicle along the first line of sight.

7. The method of claim 3 wherein the visually perceptible image and the corresponding ISAR images are converted to a faceted image rendered to appear as a solid object having facets coated according to input from the corresponding ISAR images.

8. The method of claim 7 wherein the facets are both coated and textured according to input from the corresponding ISAR images.

* * * * *